(12) United States Patent
Kaiser et al.

(10) Patent No.: US 6,617,828 B2
(45) Date of Patent: Sep. 9, 2003

(54) CIRCUIT ASSEMBLY FOR DOUBLING THE VOLTAGE OF A BATTERY

(75) Inventors: Ulrich Kaiser, Warstein (DE); Ralph Oberhuber, Kumhausen (DE)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/898,343

(22) Filed: Jul. 3, 2001

(65) Prior Publication Data

US 2003/0006736 A1 Jan. 9, 2003

(30) Foreign Application Priority Data

Jul. 3, 2000 (DE) ......................... 100 32 260

(51) Int. Cl.⁷ .................................. H02J 7/00
(52) U.S. Cl. ...................................... 320/134
(58) Field of Search ...................... 320/134, 136, 320/127, 128, 132, 163; 323/317; 327/316, 427, 429, 530, 538, 541, 543, 564

(56) References Cited

U.S. PATENT DOCUMENTS

| | | | | |
|---|---|---|---|---|
| 4,962,349 A | | 10/1990 | Albach et al. | 323/265 |
| 5,561,385 A | | 10/1996 | Choi | 327/536 |
| 5,815,027 A | * | 9/1998 | Tihanyi et al. | 327/543 |
| 5,977,751 A | * | 11/1999 | Blessing et al. | 320/134 |

FOREIGN PATENT DOCUMENTS

| | | |
|---|---|---|
| EP | 0 590 827 A2 | 4/1994 |
| EP | 0 898 355 A2 | 2/1999 |
| JP | 10032260 * | 7/1996 |
| JP | 11178325 | 2/1999 |

* cited by examiner

Primary Examiner—Edward H. Tso
Assistant Examiner—Pia Tibbits
(74) Attorney, Agent, or Firm—W. Daniel Swayze, Jr.; W. James Brady; Frederick J. Telecky, Jr.

(57) ABSTRACT

A circuit assembly for doubling the voltage of a battery includes a charge pump (12) fed by the battery voltage and controlled by a clock generator (10). The supply voltage of the clock generator is the voltage output by the charge pump (12). The source/drain circuit of a field-effect transistor (P4) is inserted in the connection between the output of the charge pump (12) and the battery (26), the field-effect transistor (P4) being ON when its gate voltage is smaller than its source voltage. Connected to the gate of the field-effect transistor (P4) is the output circuit branch (N2) of a current mirror circuit (32) through which a limited small current is derivable from the gate to ground. An auxiliary charge pump (22) is provided which receives its supply voltage from the output of the charge pump (12) and which is likewise controlled by the clock generator (10). The voltage generated by the auxiliary charge pump (22) is placed on the gate of the field-effect transistor (P4) to switch it OFF.

14 Claims, 1 Drawing Sheet

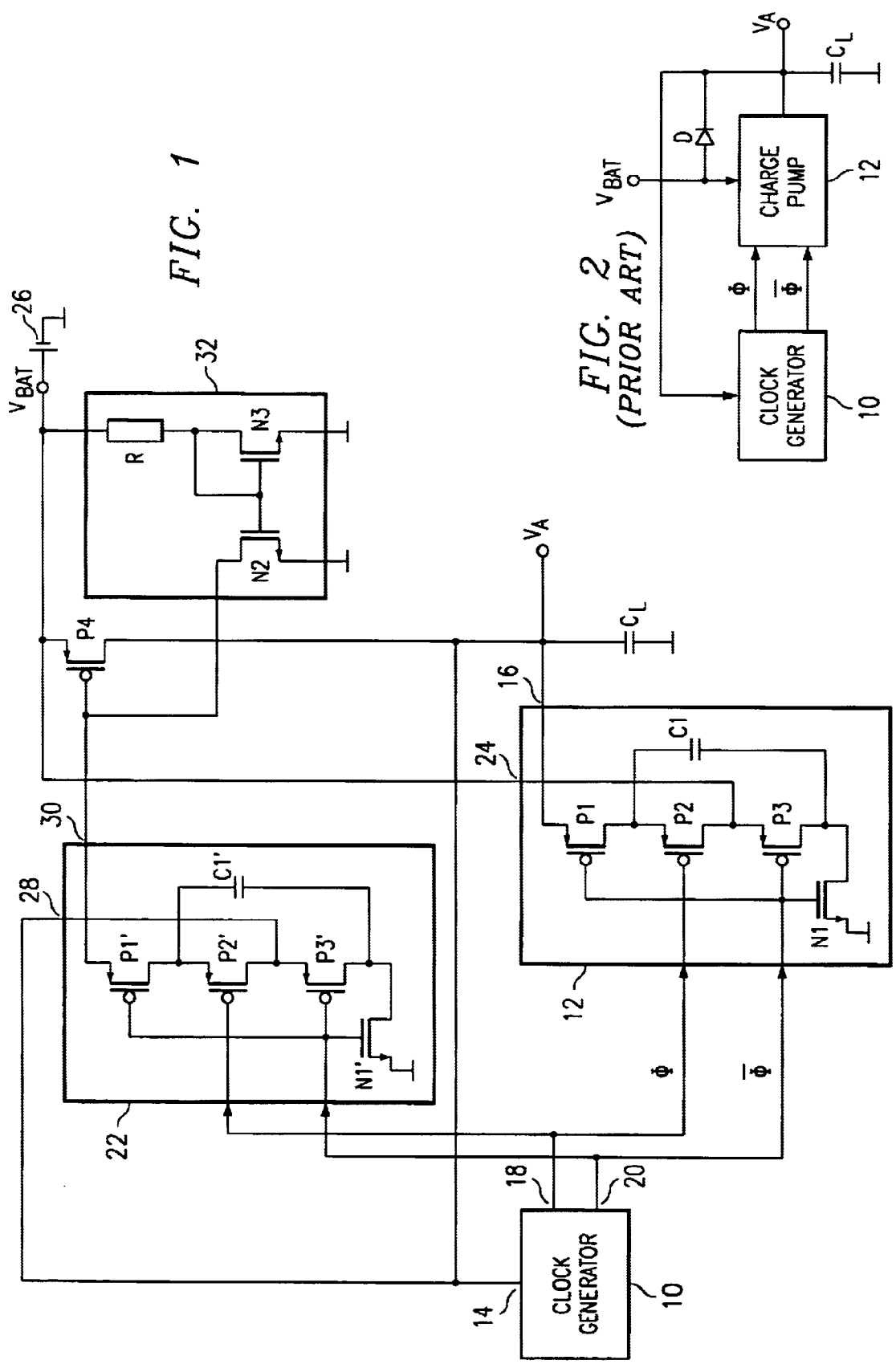

CIRCUIT ASSEMBLY FOR DOUBLING THE VOLTAGE OF A BATTERY

BACKGROUND OF THE INVENTION

The invention relates to a circuit assembly for doubling the voltage of a battery by means of a charge pump fed by the battery voltage and controlled by a clock generator whose supply voltage is the voltage output by the charge pump.

Portable electronic devices, for example, mobile telephones, obtain their supply voltage from batteries. To save weight and space batteries are used which although being designed smaller and smaller furnish a voltage which is lower than that required for operating the device. So that the voltage needed to power such electronic devices is nevertheless made available, voltage doubler circuits are put to use which may take the form of voltage converters operating on the charge pump principle. This principle of a voltage converter employing a charge pump is described for instance in the German semiconductor circuitry text book "Halbleiter-Schaltungstechnik" by U. Tietze and Ch. Schenk, 9th edition, published by Springer Verlag, pages 570/571. With the aid of this voltage converter a voltage can be obtained which is near twice that of the battery voltage. For this purpose the charge pump contains switches which are controlled with the aid of a clock employing signals opposite in phase, the switches in this arrangement being field-effect transistors which are cycled ON and OFF by the clock signals. The way in which such charge pumps work is known as such and thus is not detailed here.

One application of a voltage doubler circuit of the aforementioned kind is to be found in the Texas Instruments integrated circuit TMS37121B. This integrated circuit is put to use in processing analog signals in a transponder. FIG. 2 illustrates the basic circuit diagram of the voltage doubler circuit as employed in this integrated circuit. The clock generator 10 is of coventional configuration and furnishes two non-overlapping clock phases $\phi$ and $\bar{\phi}$. It is with these clock phases that CMOS transistors are controlled in the charge pump 12 which function as switches. The charge pump 12 produces from its supply voltage $V_{Bat}$ an output voltage $V_A$ roughly twice the supply voltage. This output voltage $V_A$ can be tapped at the capacitor $C_L$.

The p-channel field-effect transistors in the charge pump 12 can only be switched OFF totally when the clock phases $\phi$ and $\bar{\phi}$ have attained at least the level of the output voltage $V_A$. This is no problem as long as the circuit is in operation since the clock generator 10 receives as the supply voltage the output voltage $V_A$ of the charge pump 12 which is higher than the battery voltage $V_{Bat}$. However, problems are encountered on power up of the circuit since the charge pump 12 does not "start" or, to put it otherwise, it is unable to initially generate any higher output voltage as long as the clock phases $\phi$ and $\bar{\phi}$ have not attained the necessary level. To get around this problem a diode D is thus made use of which supplies the clock 10 the battery voltage $V_{Bat}$ initially as the supply voltage so that the charge pump 12 can start operation. As soon as the charge pump 12 is working it generates at its output an ever-increasing voltage $V_A$, the diode D taking care that the connection between charge pump output and the battery is open-circuited as soon as the output voltage $V_A$ exceeds the battery voltage $V_{Bat}$.

As evident, on commencement of operation the supply voltage of the clock generator 10 assumes at the most, the battery voltage $V_{Bat}$ less the forward voltage of the diode D. When, however, the battery voltage is already relatively low and also low temperatures of e.g. −40° C. exist, the circuit is no longer able to start operating because of the negative temperature coefficient of the diode forward voltage and the threshold voltages of the field-effect transistors in the clock generator, the voltage output by the charge pump is no longer sufficient for this purpose.

SUMMARY OF THE INVENTION

The invention is thus based on the objective of providing a circuit assembly of the aforementioned kind which satisfactorily starts operation at low battery voltages and low temperatures.

This and other objects and features are achieved, in accordance with one aspect of the invention, by the source/drain circuit of a field-effect transistor being inserted in the connection between the output of the charge pump and the battery, the field-effect transistor being ON when its gate voltage is smaller than its source voltage. Connected to the gate of this field-effect transistor is the output circuit branch of a current mirror circuit through which a limited small current is derivable from the gate to ground. An auxiliary charge pump is provided which receives its supply voltage from the output of the charge pump and which is likewise controlled by the clock generator, the voltage generated by this auxiliary charge pump being placed on the gate of the field-effect transistor.

By making use of a field-effect transistor in the circuit assembly in accordance with the invention for applying the battery voltage to the output of the charge pump and thus to the supply voltage input of the clock generator, on power up of the circuit the full battery voltage is available as the supply voltage. This avoids the drop in voltage by the diode as employed in prior art. At the same time by making use of the current mirror circuit it is assured that the field-effect transistor is totally ON prior to power up of the circuit while the auxiliary charge pump made use of additionally ensures that this field-effect transistor is OFF as soon as the clock generator 10 is working satisfactorily and furnishes the clock phases for controlling the charge pumps. Accordingly, the circuit assembly is able to start operating satisfactorily even when the battery voltage is low and at very low temperatures.

BRIEF DESCRIPTION OF THE DRAWINGS

The invention will now be detailed by way of an example with reference to the drawing in which:

FIG. 1 is a circuit diagram of the circuit assembly in accordance with the invention and FIG. 2 is a circuit diagram of a prior art circuit assembly.

DETAILED DESCRIPTION

Referring now to Fig. 1 there is illustrated how the clock generator 10 is connected by its supply voltage terminal 14 to the output 16 of the charge pump 12 at which it outputs the output voltage $V_A$. At outputs 18 and 20 of the clock generation it outputs the clock phases $\phi$ and $\bar{\phi}$ respectively. These clock phases control the charge pump 12 as well as the auxiliary charge pump 22. The charge pump 12 receives at its supply voltage input 24 the battery voltage $V_{Bat}$ furnished by a battery 26 while the auxiliary charge pump 22 receives at its supply voltage input 28 the output voltage $V_A$ of the charge pump 12.

The two charge pumps 12 and 22 are configured the same, they each including four field-effect transistors whose source-drain circuits are connected in parallel. The field-effect transistors P1, P2, P3 and P1', P2', P3' are p-channel field-effect transistors while the transistors N and N1' are n-channel transistors. The gates of the field-effect transistors P1, P3 in the charge pump 12 and the field-effect transistors P1', P3' in the auxiliary charge pump 22 are connected to each other and to the gate of the field-effect transistors N1 and N1' respectively. Connected in parallel to the field-effect transistors P2, P3 or P2', P3' in each charge pump is a capacitor C1 and C1' respectively. The supply voltage is applied to the charge pumps at the connecting point of the source-drain circuits of the field-effect transistors P2, P3 or P2', P3'. In each charge pump the field-effect transistor P2 and P2' respectively is controlled by the clock phase φ while the other three field-effect transistors are controlled in their charge pump by the clock phase $\bar{\phi}$.

Connected to the output 30 of the auxiliary charge pump 22 is the gate of a p-channel field-effect transistor P4, the source/drain circuit of which is connected between the battery 26 and the output 16 of the charge pump 12.

The circuit assembly as shown in FIG. 1 includes furthermore a current mirror circuit 32 comprising in the input branch a resistor R and an n-channel transistor N3 connected in series thereto while the output branch comprises a further n-channel field-effect transistor N2. The current mirror circuit 32 generates a small limited current flowing through the source/drain circuit of the n-channel field-effect transistor N2, the level of this current being defined by the resistor R connected by one end to the battery voltage $V_{Bat}$.

The functioning of the circuit assembly as shown in FIG. 1 is as follows:

When the battery voltage $V_{Bat}$ is applied to the circuit assembly as shown in FIG. 1 this voltage also becomes the supply input voltage 24 of the charge pump 12 and via the field-effect transistor P4 the supply voltage terminal 14 of the clock generator 10, it likewise becomes the supply input voltage 28 of the auxiliary charge pump 22. The current mirror circuit 32 generates a small limited current through the field-effect transistor N2 which ensures that the field-effect transistor P4 is reliably maintained ON so that the full battery voltage $V_{Bat}$ is applied to the clock generator 10. The clock generator 10 commences generating at its outputs 18 and 20 the clock phases φ and $\bar{\phi}$ for controlling the charge pump 12. Since the output 16 of the charge pump 12 is connected to the supply voltage terminal 14 of the clock generator 10 and set to the level $V_{Bat}$ it is assured that the voltage levels of the clock phases φ and $\bar{\phi}$ are not smaller than the voltage output by the charge pump 12 at the output 16. The field-effect transistors included in the charge pump 12 can thus be smoothly switched fully OFF from fully ON, this being the requirement to enable the charge pump 12 to output at its output 16 a voltage $V_A$ increasing to twice the level of the battery voltage $V_{Bat}$.

For further operation of the circuit assembly it is, however, necessary that the field-effect transistor P4 is switched OFF as soon as the charge pump 12 has "pumped" its output voltage $V_A$ to a level higher than that of the battery voltage $V_{Bat}$. To make sure of this the circuit assembly includes the auxiliary charge pump 22 which like the charge pump 12 is controlled by the clock generator 10. This auxiliary charge pump 22 is dimensioned substantially smaller, it furnishing at its output 30 merely a small current sufficient to charge the gate capacitor of the field-effect transistor P4 while the corresponding voltage at its gate increases to such an extent that it is fully OFF.

Switching the field-effect transistor P4 OFF never occurs until the clock generator 10 is already working satisfactorily since, as aforementioned, the auxiliary charge pump 22 is driven by the same clock phases as the charge pump 12, i.e. switching the field-effect transistor P4 OFF occurs precisely at the right point in time, neither too early nor too late.

While the invention has been particularly shown and described with reference to preferred embodiments thereof, it is well understood by those skilled in the art that various changes and modifications can be made in the invention without departing from the spirit and the scope of the invention as defined by the appended claims.

What is claimed is:

1. A circuit assembly for doubling the voltage of a battery comprising a charge pump fed by battery voltage and controlled by a clock generator whose supply voltage is the voltage output by said charge pump (12), a source/drain circuit of a field-effect transistor (P4) being inserted in the connection between the output of said charge pump (12) and the battery (26), said field-effect transistor (P4) being ON when its gate voltage is smaller than its source voltage, an output circuit branch of a current mirror circuit (32) through which a limited small current is derivable from the gate to ground is connected to the gate of said field-effect transistor (P4) and an auxiliary charge pump (22) being provided which receives its supply voltage from the output of said charge pump (12) and which is likewise controlled by said clock generator (10), the voltage generated by said auxiliary charge pump (22) being applied to the gate of said field-effect transistor (P4).

2. A voltage doubler circuit for doubling a battery voltage comprising:
   a first charge pump coupled to said battery by a switch;
   a second charge pump coupled to an output of said voltage doubler circuit;
   a circuit coupled to said switch, said circuit opening said switch as soon as an output of said voltage doubler circuit reaches a voltage higher than said battery voltage.

3. The voltage doubler circuit of claim 2 wherein said switch comprises a field-effect transistor.

4. The voltage doubler circuit of claim 3 wherein said field-effect transistor is a P-type transistor.

5. The voltage doubler circuit of claim 4, further comprising a current mirror for maintaining said switch in an ON state so that substantially full battery voltage is applied to said first charge pump until said circuit opens said switch.

6. The voltage doubler circuit of claim 4 wherein said second charge pump is dimensioned smaller than said first charge pump.

7. The voltage doubler circuit of claim 3 further comprising a clock generator powered by the output of said voltage doubler circuit, said clock generator controlling operation of said first and said second charge pumps.

8. The voltage doubler circuit of claim 7, further comprising a current mirror for maintaining said switch in an ON state so that substantially full battery voltage is applied to said first charge pump until said circuit opens said switch.

9. The voltage doubler circuit of claim 7 wherein said second charge pump is dimensioned smaller than said first charge pump.

10. The voltage doubler circuit of claim 3, further comprising a current mirror for maintaining said switch in an ON state so that substantially full battery voltage is applied to said first charge pump until said control circuit opens said switch.

11. The voltage doubler circuit of claim 3 wherein said second charge pump is dimensioned smaller than said first charge pump.

12. The voltage doubler circuit of claim 2, further comprising a current mirror for maintaining said switch in an ON state so that substantially full battery voltage is applied to said first charge pump until said control circuit opens said switch.

13. The voltage doubler circuit of claim 12 wherein said second charge pump is dimensioned smaller than said charge pump.

14. The voltage doubler circuit of claim 2 wherein said second charge pump is dimensioned smaller than said first charge pump.

* * * * *